United States Patent [19]

Ishii et al.

[11] 4,129,195

[45] Dec. 12, 1978

[54] DIAPHRAGM FOR SPEAKER

[75] Inventors: Yasuhiro Ishii; Shintaro Hirose, both of Gifu; Ryoichi Kawasaki, Sakai, all of Japan

[73] Assignees: Sanyo Electric Co., Ltd., Moriguchi; Tokyo Sanyo Electric Co., Ltd., Gunma, both of Japan

[21] Appl. No.: 844,904

[22] Filed: Oct. 25, 1977

Related U.S. Application Data

[63] Continuation-in-part of Ser. No. 752,480, Dec. 20, 1976.

[30] Foreign Application Priority Data

Dec. 24, 1975 [JP] Japan ................................ 50-155394

[51] Int. Cl.[2] ........................ H04R 7/12; G10K 13/00; B32B 3/10

[52] U.S. Cl. .................................... 181/167; 181/170; 428/64; 428/309; 428/311; 428/312; 428/328

[58] Field of Search .................................... 428/64–66, 428/68, 76, 137, 138, 304, 309, 312, 306, 550, 551, 579, 311; 264/111, 112, 125; 181/157, 167, 168, 170, 166

[56] References Cited

U.S. PATENT DOCUMENTS

| | | | |
|---|---|---|---|
| 2,600,220 | 6/1952 | Doelker, Jr. et al. | 428/550 |
| 3,111,187 | 11/1963 | Barlow | 181/168 |
| 3,264,720 | 8/1966 | Mott | 428/550 |
| 3,508,626 | 4/1970 | Robbins | 181/168 |
| 3,562,089 | 2/1971 | Warnaka et al. | 428/425 |
| 3,574,108 | 4/1971 | Lewis et al. | 428/425 |
| 3,761,231 | 9/1973 | Dowell et al. | 428/304 |
| 3,834,486 | 9/1974 | Tsuge et al. | 181/170 |
| 4,026,384 | 5/1977 | Yamachika et al. | 181/167 |

OTHER PUBLICATIONS

Japanese Utility Model publication 61025/1975 laid open to public in Japan on Jun. 5, 1975, 1 shtdwg, 4 p spec.

*Primary Examiner*—William J. Van Balen
*Attorney, Agent, or Firm*—Darby & Darby

[57] ABSTRACT

A diaphragm for a dynamic cone speaker which is composed of a porous metal produced from a metal such as nickel, wherein a layer, such as of aluminum foil, is disposed on a surface of the porous metal to eliminate the gas permeability of the porous metal.

10 Claims, 11 Drawing Figures

(0.4 KHz)

(1.9 KHz)

(0.8 KHz)

(1.0 KHz)

(1.6 KHz)

(2.0 KHz)

DIAPHRAGM FOR SPEAKER

REFERENCE TO COPENDING APPLICATION

This application is a continuation-in-part of U.S. patent application Ser. No. 752,480 filed Dec. 20, 1976.

BACKGROUND OF THE INVENTION

1. Field of the Invention

This invention relates to a diaphragm for a speaker and, more particularly, to an improvement in a material constituting such a diaphragm.

2. Description of the Prior Art

Greater lightness, larger hardness or stiffness, and larger internal loss (periodic damping) are requirements in the characteristics of a diaphragm for a speaker. More specifically, the uniform operation of a diaphragm is desired in a frequency range as wide as possible with respect to an input signal in order to reproduce a high fidelity sound by the speaker. Accordingly, it is advantageous for the diaphragm to be lighter and harder. In other words, it is advantageous that the ratio $E/\rho$ be larger where E is Young's modulous and $\rho$ is density. Also, the internal loss must be larger to prevent undesirable resonance.

A conventional diaphragm for a speaker could not satisfy all the desired features sufficiently. For example, although hard paper which was widely in common use had an advantage of lightness, it was inferior in hardness. Also, a light metal such as aluminum, titanium, beryllium, and the like was used as a diaphragm of a tweeter speaker of a small diameter. However, it was required to retain the bending strength across a large area of the diaphragm in order to use the diaphragm as a woofer speaker of a large diameter. Accordingly, the thickness of the diaphragm was required to be increased, thus resulting in an increased mass of the diaphragm as a whole. The increased mass thereof became an obstacle in the application of the light metal such as aluminum, titanium, and the like to a speaker of a large diameter. As a method of applying these light metals to a diaphragm of a speaker of a large diameter, a construction is proposed by Barlow, "The Development of a Sandwich Construction Loudspeaker System," Journal of the Audio Engineering Society, June 1970, Vol. 18, No. 3, wherein a porous synthetic resin is used as a dampling material (core material) and it is sandwiched between light metals such as aluminum, and the like. However, such a method does not show the nature of the metals completely.

Also, in the conventional paper-made diaphragm and metal-made diaphragm, the physical conditions of the material restrict the design conditions of the speaker unit. Thus, changes in the physical conditions of the diaphragm restrict the free setting of the acoustic characteristics.

A prior art of interest to this invention may be found in Japanese Utility Model Laying-Open No. 61025/1975 dated June 5, 1975. In brief, it discloses an electro-acoustic transducer diaphragm comprising a metal base material having continuous pores filled with an organic compound which provides a high internal loss, the surface of said base material being formed with a layer of metal plating. As for the metal base material having continuous pores, porous metals, such as aluminum and iron oxides, having an apparent specific gravity of about 0.3–0.5 are taught therein. The cited gazette makes no mention of a method of producing such base materials. In the above referenced gazette, the organic compound is incorporated for the purpose of increasing the internal loss of the diaphragm and latexes such as acrylonitrile butatadiene copolymer, styrene butadiene rubber and ethylene vinyl chloride are given as examples thereof. The composite comprising a metal base material having continuous pores filled with an organic compound which provides a high internal loss has a layer of metal plating formed thereon for the purpose of adding to the mechanical strength of the base material. The layer of metal plating may contain copper, nickel, chromium or various alloys. The method of forming such layer of metal plating disclosed therein comprises the first step of activating the surfaces of the base material and organic compound, the second step of performing non-electrolytic plating and the third step of performing electroplating.

The porous metal used in the electro-acoustic transducer disclosed in the above referenced gazette is disadvantageous in that it has a high Q value. Generally, Q value is related to the internal loss, and materials with high Q values have low internal losses. Generally, metals have high Q values and hence low internal losses since the resistance component across the grain boundary is small. In order to improve the characteristics of a speaker diaphragm, higher internal loss is preferable. The electro-acoustic transducer disclosed in the above referenced gazette uses as a base material a metal whose porosity is low. As a result, the feature of metals having high Q values is passed on to the transducer diaphragm. Therefore, with a porous metal alone, it is impossible to provide a speaker diaphragm having desired characteristics. It is because the inventor in the above referenced gazette was aware of this disadvantage that he filled the pores with an organic material to increase the internal loss.

The electro-acoustic transducer disclosed in the above referenced gazette has the pores filled with an organic material of high internal loss for the purpose of improving the characteristics dependent on internal loss, as described above. However, organic materials of high internal loss generally have high specific gravities, so that the filling with said organic material obviates the feature of porous metals being light weight. The electro-acoustic transducer in the above referenced gazette is designed to have an increased mechanical strength by plating with a heavy metal such as copper, nickel, or chromium the composite comprising a porous metal such as aluminum and an organic compound of high internal loss filled into the pores therein. When aluminum and nickel foils having the same weight are considered, the aluminum foil has about ten times the rigidity, or stiffness, of the nickel foil. Further, when the rigidities provided by a foil and by a layer of plating are compared, the foil, of course, provides a higher rigidity. On the other hand, when aluminum and nickel foils having the same degree of rigidity are compared, the nickel foil is heavier. With all these taken into consideration, it may be said that although the transducer disclosed in the above referenced gazette may have an increase in mechanical strength provided by nickel plating, it has a disadvantage that the resulting increase in weight kills the feature of the porous metal being light weight. Thus, plating a composite including a porous metal with a heavy metal cannot avoid increasing the weight. Furthermore, plating requires that the surface of an object to be plated be treated in advance to provide for plating. Therefore, the disclosed transducer needs such processes as surface activation and non-electrolytic plating, resulting in an increase in the number of processing steps and increased cost. Further, the disclosed transducer may undergo a large volumetric change due to heat and the organic material used as the filler, so that it is liable to suffer the deformation of the speaker diaphragm and the variation of the characteristics.

SUMMARY OF THE INVENTION

The diaphragm for a speaker in accordance with this invention can eliminate the above described disadvantages encountered in the above described prior art diaphragm for a speaker.

The diaphragm for a speaker in accordance with the invention is composed of a porous metal or a metallic porous material sheet, which has a porosity as high as 90 to 99%. The porous metal has the characteristics of retaining the hardness of the metal as material and reducing its weight to one that of several tenths of the metal as the material. Accordingly, these characteristics of the material are extremely advantageous, especially in the case where the material is used as a diaphragm for a speaker which requires a high ratio $E/\rho$.

A porous metal may be made by rolling, for example, metallic powder into a compression powder sheet of a given thickness, and thereafter sintering it in a closed furnace filled with nitrogen gas, and so on. Proper selection of the rolling conditions and the closed furnace operating conditions enables it to produce a porous metal sheet of a desired porosity and thickness.

Generally, it is understood that the area density of the diaphragm for a speaker is required to be set to 0.02 to 0.06g/cm$^2$. As the porous metal diaphragm of this invention has a very large degree of freedom concerning the setting of the area density by selection of the porosity and thickness of the metal, the porous metal diaphragm has an advantage of being capable of setting the area density freely. The advantage is one of the characteristics of this invention.

Considering an example where the area density is to be set at 0.027g/cm$^2$, this can be derived from the following equation;

Area density (g/cm$^2$) = density (g/cm$^3$) $\times$ thickness (cm). If the porosity is set to 98% (apparent density 0.18g/cm$^3$), the thickness would be 0.15 cm when nickel is used as the metal material.

A material such as nickel, aluminum, titanium, beryllium, and the like is used as a porous metal. The design conditions of the speaker unit determine which material to use or the porosity and thickness of the material.

On the other hand, as the pores of the porous metal are generally in communication with each other, some permeability is provided. Accordingly, when the porous metal is used as a diaphragm a speaker, the air has to be prevented from being leaked from the pores during the vibration of the diaphragm. The diaphragm a speaker in accordance with this invention comprises an impermeable surface layer formed on at least one surface of the porous metal sheet for removing the permeability of the porous metal.

Alternatively, the porous metal may be produced by molding defilmed foam polyurethane into a cone form, plating the mesh structured polyurethane with a metal, e.g. nickel, which provides a porous metal, heat treating the metal plated foam polyurethane to thereby gasify said polyurethane for removal, and shaping the mesh structured metal by pressing the same.

Accordingly, it is a primary object of this invention to provide an improved diaphragm for a speaker which is capable of obtaining the high fidelity sounds of the original sounds.

It is another object of this invention to provide an improved construction material for a speaker diaphragm, the material being lighter and harder.

It is a further object of this invention to provide a diaphragm for a speaker which can operate evenly across the wide frequency range.

It is still another object of this invention to provide a diaphragm for a speaker, the internal loss thereof being made larger in order to prevent undesirable resonance.

These and other objects and features of the invention will become more apparent from the following detailed description when taken in conjunction with the accompanying drawings.

DESCRIPTION OF THE PREFERRED EMBODIMENT

Figure 1:
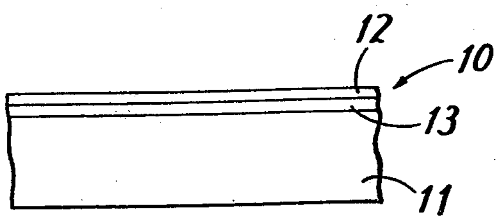
FIG. 1 is a cross-sectional view showing one embodiment of a diaphragm of this invention.

FIG. 1 is a cross-sectional view showing one embodiment of the diaphragm made by the use of the porous metal in accordance with this invention. Referring to FIG. 1, the diaphragm 10 comprises a porous metal layer 11 made of nickel. The porous metal constituting the layer 11 is a porous material. As many of the pores are permeable, it is required to eliminate the permeability in order to use the porous material as a diaphragm for a speaker. In accordance with this invention, a surface layer 12, which is not permeable is formed, on the surface of the porous metal layer 11. The surface layer 12 is composed of, for example, a synthetic resin sheet, metal foil, metal membrane, or the like. The surface layer 12 is securely bonded, through a layer 13 of bonding agent, on the surface of the porous metal layer 11. The bonding of the surface layer 12 can be performed through a heat-melting operation without using the bonding agent if the surface layer 12 is made of plastic sheet.

The surface layer 12 is normally provided only on one surface of the porous metal layer 11, since it performs the required function satisfactorily. However, the surface layer may be provided on both surfaces thereof, if desired.

Figure 2:
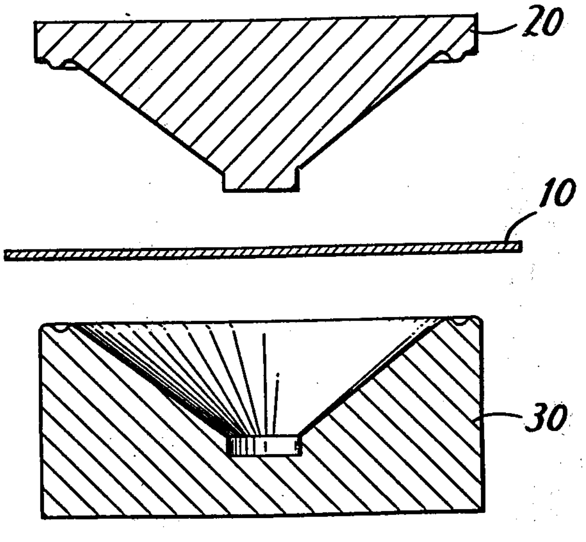
FIG. 2 is a view for illustrating one example of a method for forming the diaphragm of FIG. 1 into a shape.

FIG. 2 is a view for illustrating an example of a method for forming the diaphragm 10 shown in FIG. 1 into a cone shaped diaphragm as a diaphragm for a dynamic cone speaker. A flat shaped diaphragm 10 is placed between a concave metal mold 30 and a convex mold 20, and is held therebetween for press working operation. Thus, a cone shaped diaphragm is formed. Since the shape of the diaphragm which has been formed into the cone shape can be readily understood from the shapes of the metal molds 20 and 30, the drawings thereof are omitted.

The method shown in FIG. 2 includes a step of forming such a diaphragm as shown in FIG. 1, and forming it into the cone shape, the diaphragm being made of a porous metal 11 upon which a surface layer 12 is adhered by a bonding agent 13.

A porous metal may be made by rolling, for example, metallic powder into a compression powder sheet of a given thickness, and thereafter sintering it in a closed furnace filled with nitrogen gas, and so on. Proper selection of the rolling conditions and the closed furnace operating conditions enables it to produce a porous metal sheet of a desired porosity and thickness.

Figure 6:
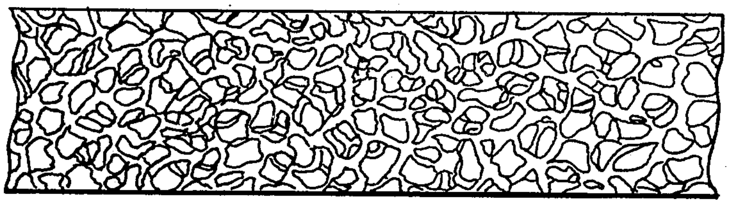
FIG. 6 is a sectional view showing a detailed internal structure of a porous metal sheet for use in this invention.

A method of producing a porous metal more suitable for the speaker diaphragm of this invention is taught in British Pat. No. 1,199,404. In brief, the technique taught in the British patent comprises the steps of molding defilmed foam polyurethane into a cone form, plating the mesh structured foam polyurethane with a metal, such as nickel, chromium, copper or iron, which provides a porous metal, heat treating the plated foam polyurethane to thereby gasify said polyurethane for removal, and shaping the mesh structured metal by pressing the same. The step of molding foam polyurethane into a cone form may comprises the step of applying a special process to ordinary foam polyurethane to remove the films and the step of foaming the foam polyurethane itself into a cone form or molding the foam polyurethane into a cone form. The cross sectional structure of a porous metal produced by such plating method is shown in FIG. 6.

Examples of forming speaker diaphragm from a porous metal will now be described in detail. First, an aluminum foil having a filmy adhesive applied thereto is heat-pressure bonded to a three-dimensional mesh structured metal produced in the manner described above. The adhesive melts and the porous metal and the aluminum foil are bonded together. At this time, the aluminum, titanium or beryllium foil is firmly bonded to the uneven surface of the porous metal under pressure. The resulting composite is trimmed to provide a finished product. The aluminum foil is applied to one or both surfaces of the porous metal. It has been found that the application of aluminum foil to both surface is much more satisfactory from the standpoint of rigidity.

Various factors in an embodiment believed to be more preferable are listed below.

Porous metal — Ni (1.5 mm thick)
Porosity — 97%
Method of Production — plating
Lining layer — 20μ-thick Al foil applied to one surface (gravity of Al: 2.7)
Area density — porous metal itself — 0.0356 g/cm$^2$; finished product — 0.055 g/cm$^2$
Rigidity — porous metal itself — 15–20 kg/mm$^2$; finished product — 75 kg/mm$^2$ One embodiment of this invention was produced as described hereinafter. Nickel was used as a porous metal material. The pore diameter of 0.15 mmΦ, the porosity of 98% and the diaphragm thickness of 1.5 mm were provided. A speaker of 25cm in diameter was manufactured with a diaphragm, on whose front face vinyl chloride sheet of 50μ was applied. The characteristics of the speaker was shown in Table 1.

Table 1

| | E/ρ | mass of the diaphragm |
|---|---|---|
| nickel porous metal of this invention 25 cm speaker | 2.2 ×10$^8$ | 8.1g |
| conventional paper vibrating body 25 cm speaker | 0.49×10$^8$ | 9.5g |

As described hereinabove, the diaphragm of this invention is five times higher in E/ρ than the diaphragm of the conventional paper cone. Also, the mass of the diaphragm of this invention is approximately the same as that of the paper.

Comparison of the acoustic characteristics was made between cone type speakers, one using the porous metal diaphragm of this invention and the other using the conventional paper diaphragm, the characteristics of the diaphragm being shown in the following Table 2. The construction, except the diaphragm, was made the same for the comparison between the both speakers.

Table 2

| | paper diaphragm | porous metal diaphragm |
|---|---|---|
| thickness | 1.3 mm | 1.7 mm |
| area density | 0.04g/cm$^2$ | 0.05g/cm$^2$ |
| core vertical angle | 114 degrees | 120 degrees |
| diameter | 25 cm | 25 cm |

Figure 3A:
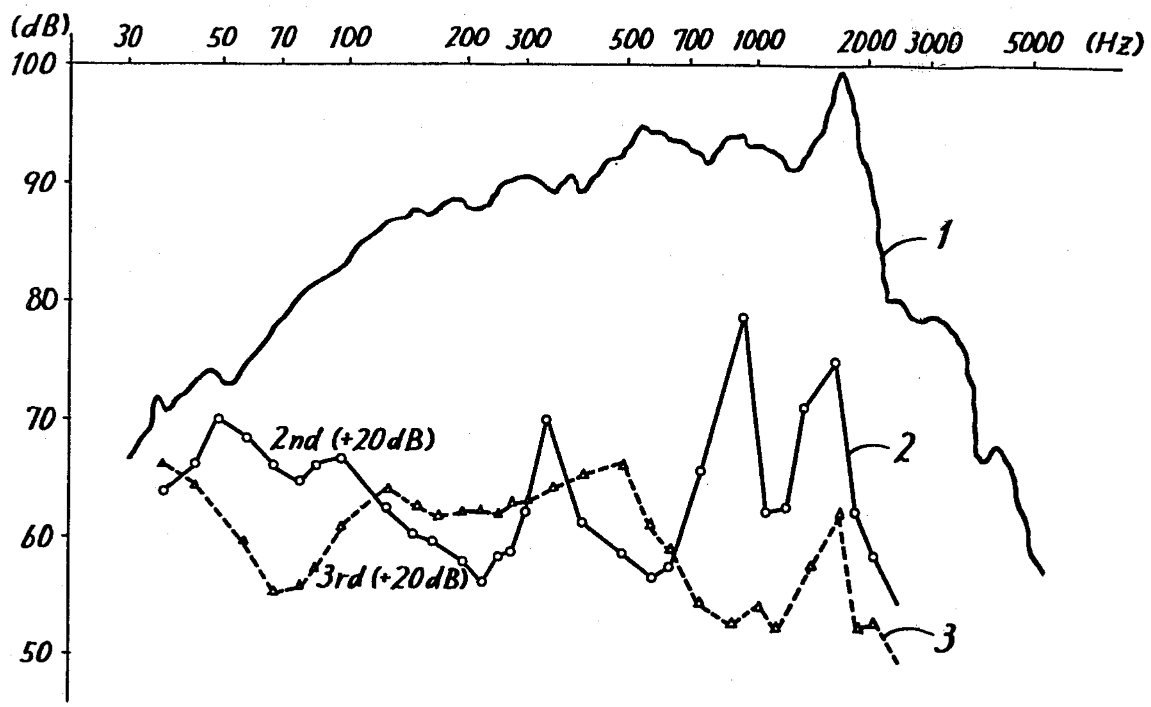
FIGS. 3A and 3B shown sound pressure level-to-frequency characteristics and second, third harmonic distortions, FIG. 3A showing the characteristics of the conventional paper diaphragm, and FIG. 3B showing the characteristics of the porous metal diaphragm in accordance with the invention.
Figure 3B:
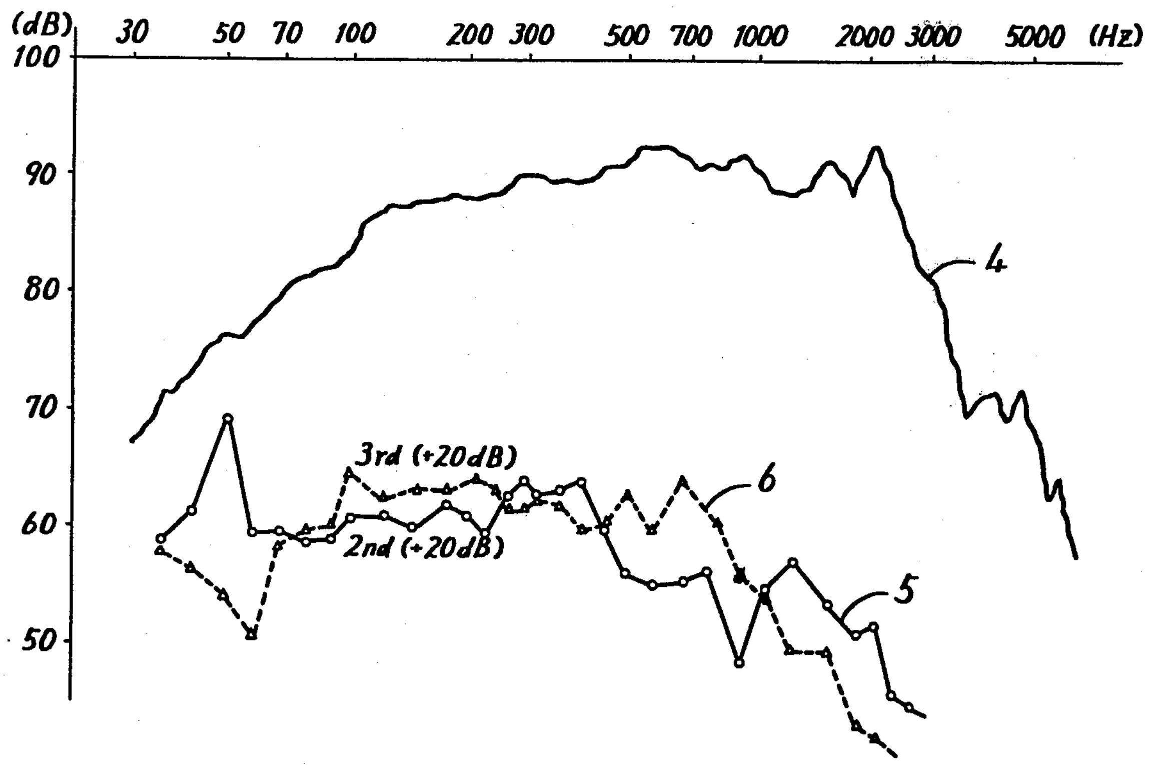

FIGS. 3A and 3B show measured characteristics of sound pressure to frequency, and measured second, third harmonic distortions. FIG. 3A shows the characteristics of the conventional paper diaphragm, while FIG. 3B shows the characteristics of the porous metal diaphragm in accordance with the present invention. The line 1 of FIG. 3A and the line 4 of the FIG. 3B show the characteristics of sound pressure to frequency. The line 2 of FIG. 3A and the line 5 of FIG. 3B show the second harmonic distortions, respectively, while the line 3 of FIG. 3A and the line 6 of FIG. 3B show the third harmonic distortions, respectively.

Figure 4A:
FIGS. 4A and 4B, and FIGS. 5A, 5B, 5C and 5D are photographic views showing the vibration appearances of the diaphragm by holography, FIGS. 4A and 4B showing the vibration appearances of the conventional diaphragm, and FIGS. 5A, 5B, 5C and 5D showing the vibration appearances of the porous metal diaphragm in accordance with this invention.
Figure 4B:
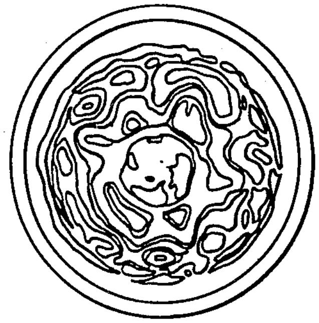

On the other hand, FIGS. 4A and 4B, and FIGS. 5A, 5B, 5C and 5D are photographic views showing the vibration appearances of the diaphragm by holography, respectively. FIGS. 4A and 4B show the vibration appearances of the conventional paper diaphragm. FIGS. 5A, 5B, 5C and 5D show the vibration appearances of the porous metal diaphragm in accordance with the present invention, respectively. Input signal frequencies are shown, respectively, inside the parentheses of each view.

As apparent from the line 1 of FIG. 3A, undesirable resonance is produced from near 400Hz. Conspicuously, the peak of 2KHz is great. However, in the line 4 of FIG. 3B of this invention, undesirable resonance is not produced up to approximately 1KHz. The undesirable resonance of approximately 1KHz or more is also small in amount and the disorder in characteristics is less.

Figure 5A:
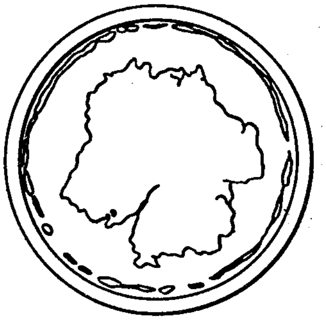
Figure 5B:
Figure 5C:
Figure 5D:

The differences in the split vibration can be better understood through the comparison between FIGS. 4A and 4B, and FIGS. 5A, 5B, 5C and 5D. In FIG. 4A, it is recognized that interfererence stripes are already produced, in the 0.4KHz, due to the undesirable resonance. However, referring to FIGS. 5A and 5C, distinct interference stripes cannot be recognized even in approximately 0.8 to 1.6KHz. In addition, when FIG. 4B is compared with FIG. 5D, FIG. 4B shows the vibration appearances in 1.9KHz, while FIG. 5D shows the vibration appearances in 2.0KHz. FIG. 4B shows clearer interference stripes. This fact shows that the amount of the undesirable resonance is larger.

This difference in the strains can be understood through the comparisons between the lines 2 and 3 of FIG. 3A, and between the lines 5 and 6 of FIG. 3B. Through comparison therebetween, it is obvious that the second and third harmonic distortions are both produced less in FIG. 3B.

Features of the porous metal made diaphragm according to this invention will now be described in comparison with the technique disclosed in the Japanese laying-open gazette referenced hereinbefore.

Features of Porous Metal

The porous metal used in this invention has a porosity of as high as 90–98%. As a result, the attribute of the metal having a high Q value is sufficiently mitigated to provide a low Q value. Therefore, without the need to incorporate a material of high internal loss, it is possible to provide a speaker diaphragm having a sufficiently high internal loss.

Since the speaker diaphragm according to this invention uses a sheet-like lining layer or patch, the application thereof provides an increase in rigidity, and such increase of rigidity is evenly effected without causing any unevenness. In the case of the cited technique, the use of plating entails unevenness.

Since the speaker diaphragm can be produced by simply applying the sheet-like lining layer to the surface of the porous metal, fabrication is easy and the cost is low.

Features of Foil of Light Metal, Such As Aluminum, Being Used As Sheet-Like Lining Layer For example, aluminum has a specific gravity of 2.699 and a Young's modulus of 7,220, whereas nickel has a specific gravity of 8.90 and a Young's modulus of 19,700. When aluminum and nickel foils having the same weight and same area are compared with each other with respect to bending rigidity (= EI where E is Young's modulus and I is second moment of area), the bending rigidity of the aluminum foil is about 13 times that of the nickel foil. This demonstrates that when masses of the same weight are to be added, a light metal, such as aluminum, provides higher rigidity than a heavy metal, such as nickel.

It is also well known that when a foil and layer of plating are compared, the foil provides much higher rigidity (on the basis of the same weight).

Therefore, the application of a light metal foil has the advantage of providing higher rigidity without entailing any substantial increase in weight, and the application of said light metal foil to a lightweight porous metal having a porosity of 90–98% provides an article which is lightweight and has high rigidity, optimum for a speaker diaphragm.

Features of Three-Dimensional Mesh Structured Porous Metal Produced By Plating Method The three-dimensional mesh structured porous metal has very high rigidity because of its continuous mesh structure. Bonding between particles by sintering is surface bonding and fails to provide sufficient rigidity because of its liability to become uneven and produce closed spaces.

Further, among methods of working a porous metal into a cone form are:

(i) To originally shape into a cone form;
(ii) To draw a sheet into a cone form;
(iii) To bend a sheet and join the opposed edges together.

In the case of sintering, the method (i) requires complicated equipment, involving an increase in cost, the method (ii) provides only a shallow cone form, and the method (iii) has the disadvantage of producing a seam. On the other hand, in the case of plating, the method (ii) and (iii) provide the same results as in the case of sintering, but the method (i) has the advantage that the liability of foam polyurethane allows it to be wrought into a cone form which may then be plated to provide any desired cone.

The three-dimensional mesh structured porous metal can have truly communicating pores. On the other hand, those produced by sintering have a strong possibility of forming closed spaces depending on the interparticle bonding condition. Particularly when a filter is stuffed into the pores as in the case of the above referenced technique, said closed spaces will be left unfilled, entailing unevenness.

Features of Porous Metal Speaker Diaphragm According To This Invention Using No Filler to Fill Pores Free passage of air through the pores assures satisfactory heat dissipation.

In the surface having no sheet applied thereto, since the pores and porous metal grains are irregularly arranged, the viscous resistance to fluid is high and hence the resistance to radiation is increased. Therefore, there is an advantage that the braking effect and radiation efficiency are much higher than in the case of the above referenced technique in which the pores are filled.

The surface with porous metal exposed adds freshness to the appearance.

Although the present invention has been described and illustrated in detail, it is to be clearly understood that the same is by way of illustration and example only and is not to be taken by way of limitation, the spirit and scope of this invention being limited only by the terms of the appended claims.

What is claimed is:

1. A speaker diaphragm in a laminar form comprising a porous metal formed in the shape of the diaphragm and having a porosity in the range of from about 90% to about 98%, the pores of the metal material being substantially void of solid material and a layer of air-impermeable material applied to at least one surface of said porous metal to block the pores of said porous metal to air flow and to increase the rigidity of said porous metal.

2. A speaker diaphragm as set forth in claim 1, wherein said layer comprises a synthetic resin sheet.

3. A speaker diaphragm as set forth in claim 1, wherein said layer comprises a metal foil.

4. A speaker diaphragm as set forth in claim 1, wherein said layer is applied to only one surface of the porous metal to provide a two-layer structure as a whole.

5. A speaker diaphragm as set forth in claim 1, wherein said layer is applied to both surfaces of the porous metal to provide a three-layer structure as a whole.

6. A speaker diaphragm in a laminar form comprising a sheet of porous metal material formed from sintered metal particles of aluminum and formed into the shape of the diaphragm, and a layer of an air-impermeable material applied to a surface of said porous metal to block the pores of said porous metal to air flow and to increase the rigidity of said porous metal.

7. A speaker diaphragm in a laminar form comprising a three-dimensional mesh-structured porous metal made of a heavy metal selected from the group consisting of nickel, iron or copper, and a layer of air-impermeable material applied to a surface of said porous metal to block the pores of said porous metal to air flow and to increase the rigidity of said porous metal.

8. A speaker diaphragm as set forth in claim 7, wherein said layer comprises a metal foil.

9. A speaker diaphragm as set forth in claim 7, wherein said porous metal is produced by a method comprising the step of preparing defilmed foam urethane, the step of plating the foam urethane with said heavy metal and the step of removing the foam urethane by heat treatment.

10. A speaker diaphragm comprising a three-dimensional mesh-structured porous nickel metal having a porosity in the range of from about 90% to about 98% and an area density in the range of from about 0.02 to about 0.06 g/cm$^2$, and aluminum foil attached to a surface of said porous metal by an adhesive to block the pores of said porous metal to air flow and to increase the rigidity of said porous metal.

* * * * *